US012220721B2

(12) United States Patent
Pereira

(10) Patent No.: US 12,220,721 B2
(45) Date of Patent: Feb. 11, 2025

(54) BACKPACK PAINT SPRAYER

(71) Applicant: Marcelo Pereira, Revere, MA (US)

(72) Inventor: Marcelo Pereira, Revere, MA (US)

( * ) Notice: Subject to any disclaimer, the term of this patent is extended or adjusted under 35 U.S.C. 154(b) by 500 days.

(21) Appl. No.: 17/694,806

(22) Filed: Mar. 15, 2022

(65) Prior Publication Data

US 2023/0294117 A1 Sep. 21, 2023

(51) Int. Cl.
*B05B 7/24* (2006.01)
*B05B 7/00* (2006.01)
*B05B 15/40* (2018.01)

(52) U.S. Cl.
CPC .......... *B05B 7/2475* (2013.01); *B05B 7/2464* (2013.01); *B05B 7/0081* (2013.01); *B05B 7/2418* (2013.01); *B05B 15/40* (2018.02)

(58) Field of Classification Search
CPC ... B05B 7/2475; B05B 7/2464; B05B 7/0081; B05B 7/2418; B05B 15/40
USPC .......................................................... 239/154
See application file for complete search history.

(56) References Cited

U.S. PATENT DOCUMENTS 218,789 A * 8/1879 Spalding ............... B05B 9/0894 239/153
1,081,648 A * 12/1913 Adams ................. B01D 35/005 210/418
5,248,089 A * 9/1993 Bekius ...................... B05B 9/08 239/154
5,636,791 A * 6/1997 Leer ...................... B05B 9/0877 239/153
9,227,208 B2 1/2016 Lin
9,486,063 B2 11/2016 Roman
D809,626 S 2/2018 Bonaventura
9,889,464 B1 * 2/2018 Winne .................... E04F 21/08
10,562,052 B2 2/2020 Fontaine
11,235,890 B1 * 2/2022 Dahlstrom ............... B64D 1/18
11,642,683 B2 * 5/2023 Mantes ...................... B05B 9/01 239/146
2005/0006400 A1 * 1/2005 Shapanus .............. B05B 9/0861 222/1
2008/0251607 A1 * 10/2008 Krayer .................. B05B 7/0081 239/290
2011/0198413 A1 * 8/2011 Thompson ............ B05B 9/0866 239/332
2016/0008831 A1 1/2016 Kumar
2017/0173607 A1 * 6/2017 Wright .................. B05B 9/0861
2020/0316625 A1 10/2020 Jensen
2020/0368774 A1 11/2020 Masters (Continued)

FOREIGN PATENT DOCUMENTS

CA 2899625 12/2020

*Primary Examiner* — Qingzhang Zhou
*Assistant Examiner* — Kevin Edward Schwartz
(74) *Attorney, Agent, or Firm* — Kyle A. Fletcher, Esq.

(57) ABSTRACT

The backpack paint sprayer comprises a backpack, a spray gun, and a hose assembly. The backpack paint sprayer may be a portable spray-painting system. The backpack may carry a supply of paint which may be pumped from the backpack to the spray gun via the hose assembly. A turbine located within the spray gun may create an air stream that may atomize the paint and may disperse the paint over a surface being painted. The backpack may be adapted to be worn by a user and may enable the user to move about without being constrained by a paint supply hose coupled between the spray gun and a compressor.

17 Claims, 4 Drawing Sheets

(56) References Cited

U.S. PATENT DOCUMENTS

| | | | | |
|---|---|---|---|---|
| 2021/0046494 | A1* | 2/2021 | Lam | B05B 9/0888 |
| 2021/0402422 | A1* | 12/2021 | Kinne | B05B 5/1675 |

* cited by examiner

BACKPACK PAINT SPRAYER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of spray painting, more specifically, a backpack paint sprayer.

SUMMARY OF INVENTION

The backpack paint sprayer comprises a backpack, a spray gun, and a hose assembly. The backpack paint sprayer may be a portable spray-painting system. The backpack may carry a supply of paint which may be pumped from the backpack to the spray gun via the hose assembly. A turbine located within the spray gun may create an air stream that may atomize the paint and may disperse the paint over a surface being painted. The backpack may be adapted to be worn by a user and may enable the user to move about without being constrained by a paint supply hose coupled between the spray gun and a compressor.

An object of the invention is to provide a portable spray painting system operable to spray paint onto a surface via a spray gun.

Another object of the invention is to provide the spray gun with a supply of paint pumped from a backpack worn by the user.

A further object of the invention is to provide a fan in the spray gun and a pump in the backpack; said fan operable to create an atomizing air stream and said pump operable to move paint from a reservoir in the back pack to the spray gun.

Yet another object of the invention is to provide a reservoir comprising a removable liner and filled via a filler tray and strainer.

These together with additional objects, features and advantages of the backpack paint sprayer will be readily apparent to those of ordinary skill in the art upon reading the following detailed description of the presently preferred, but nonetheless illustrative, embodiments when taken in conjunction with the accompanying drawings.

In this respect, before explaining the current embodiments of the backpack paint sprayer in detail, it is to be understood that the backpack paint sprayer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the backpack paint sprayer.

It is therefore important that the claims be regarded as including such equivalent construction insofar as they do not depart from the spirit and scope of the backpack paint sprayer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
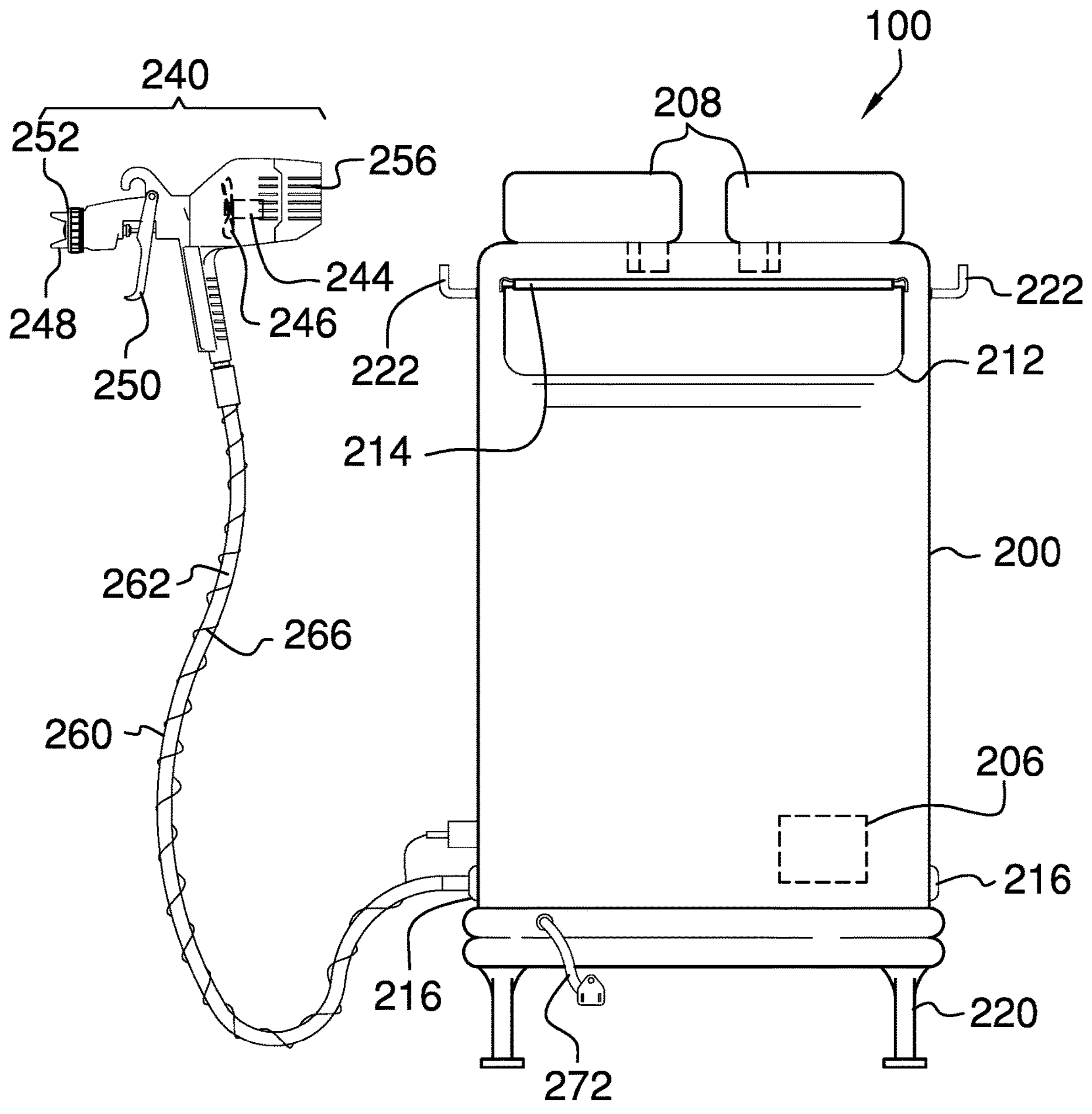
FIG. 1 is a front view of an embodiment of the disclosure.
Figure 2:
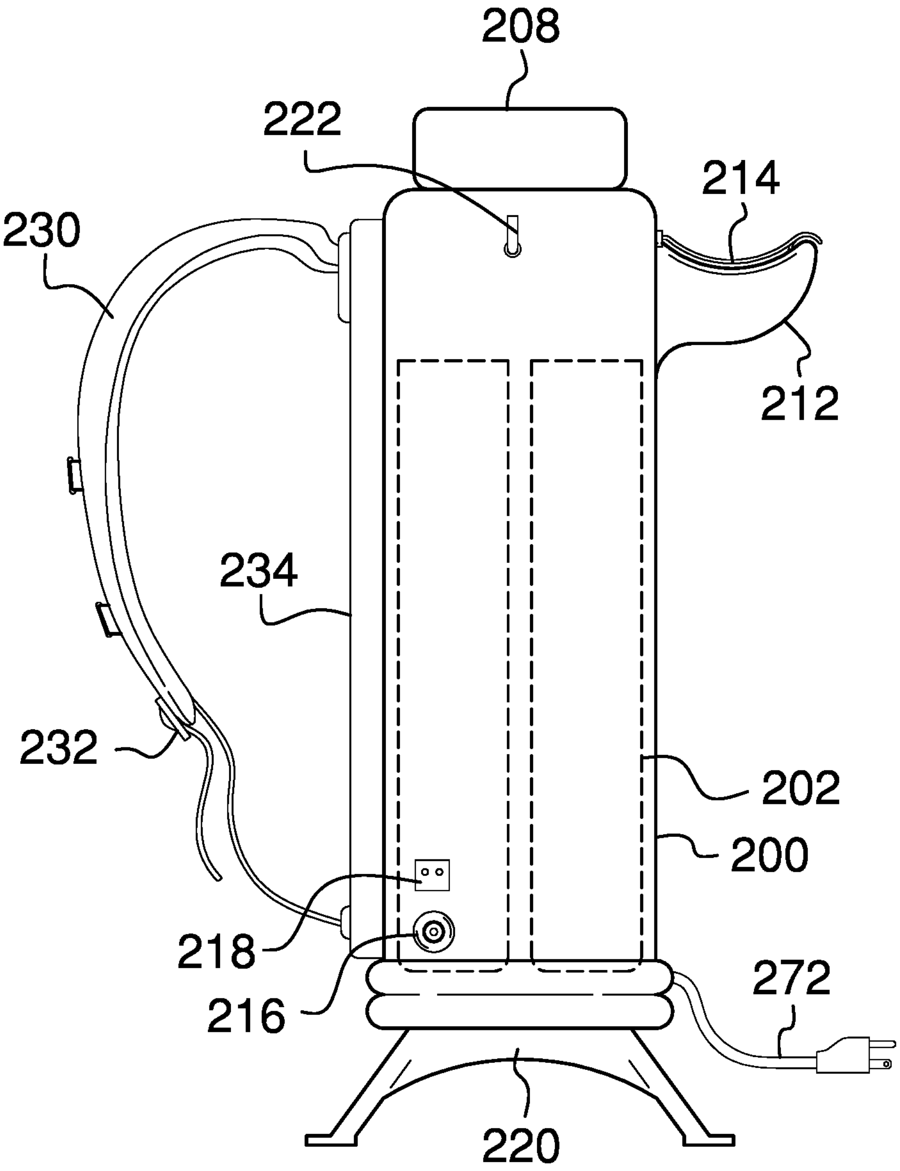
FIG. 2 is a left side view of an embodiment of the disclosure.
Figure 3:
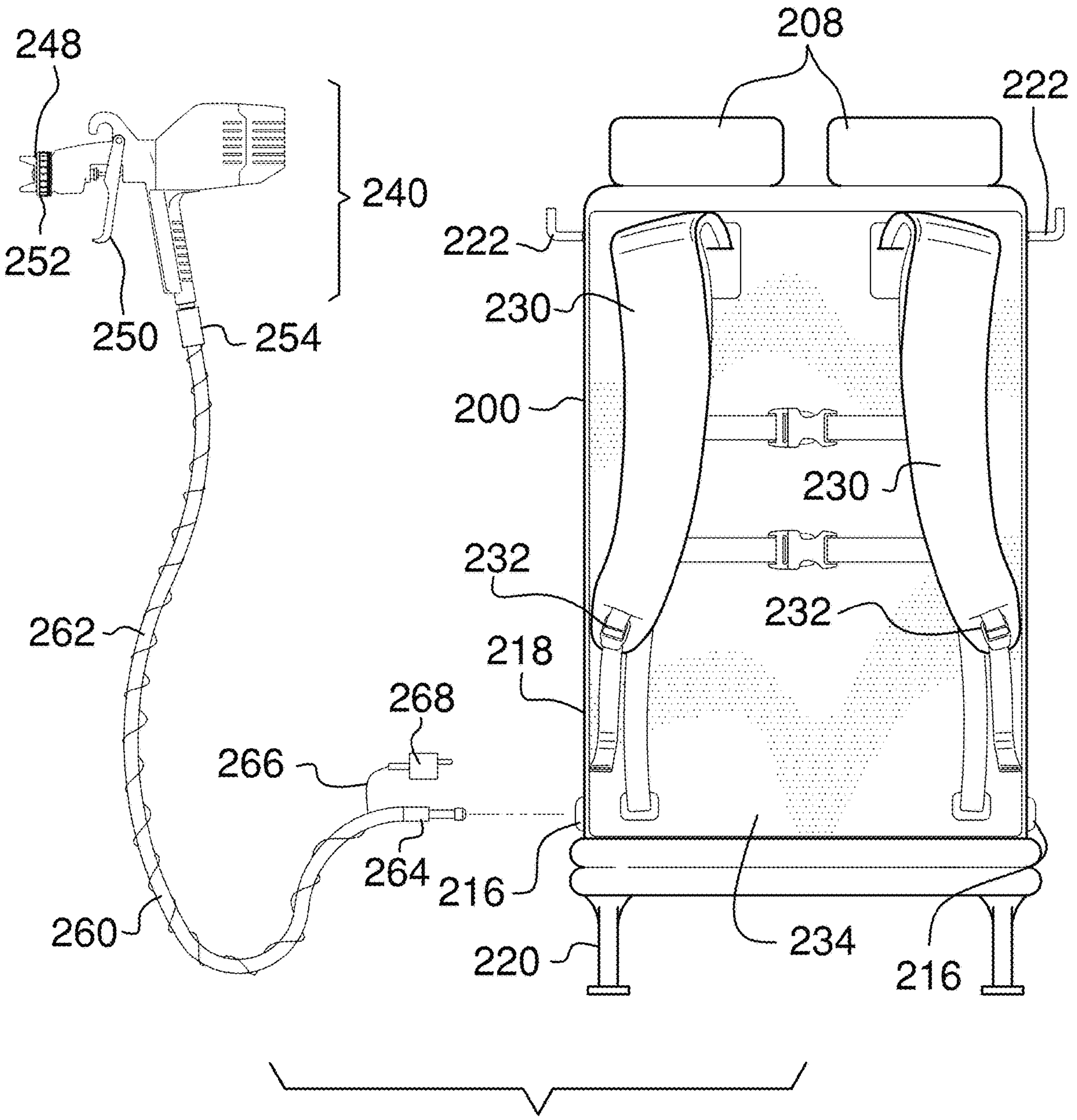
FIG. 3 is a rear view of an embodiment of the disclosure.
Figure 4:
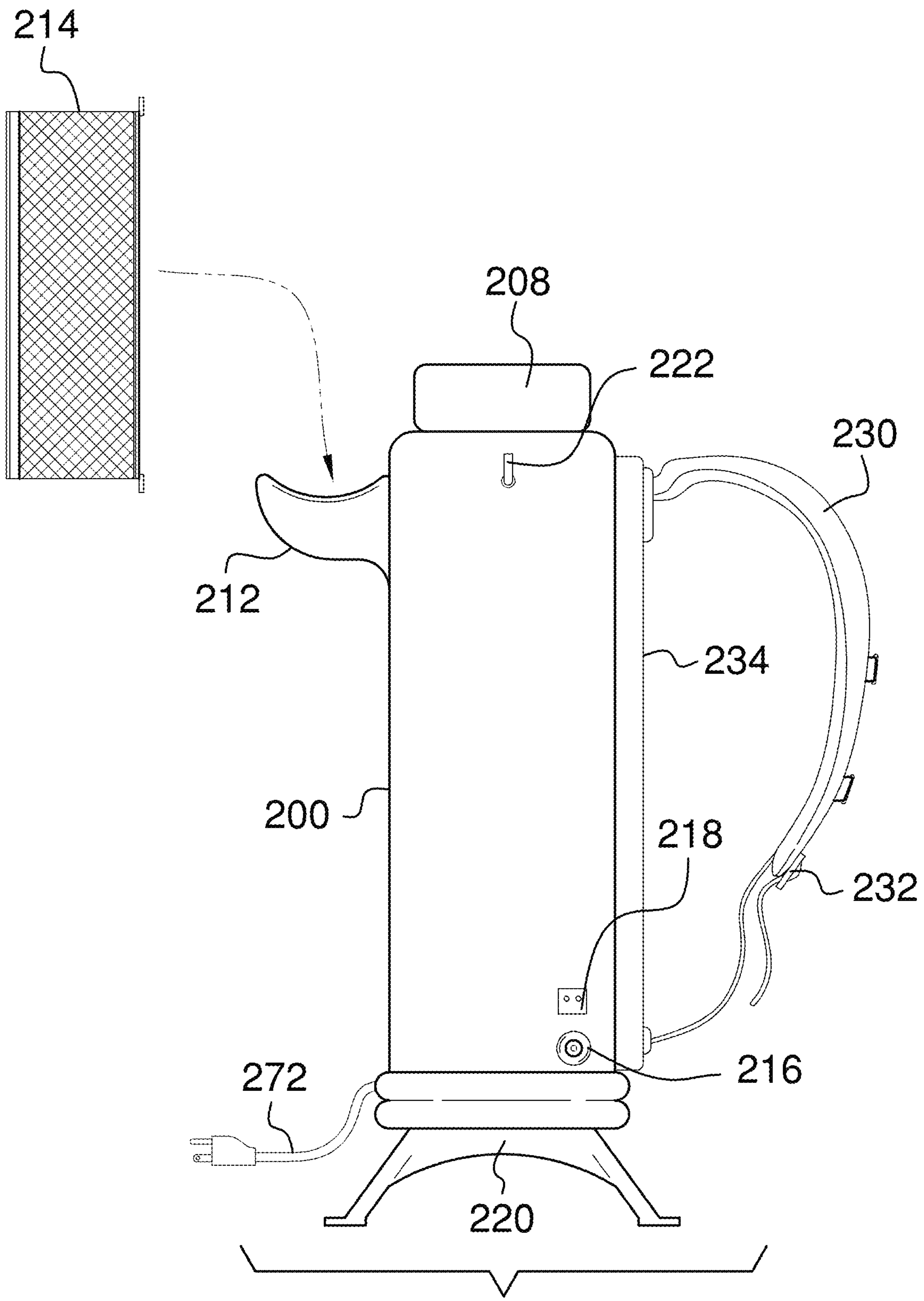
FIG. 4 is a right side view of an embodiment of the disclosure.

Detailed reference will now be made to a first potential embodiment of the disclosure, which is illustrated in FIGS. 1 through 4.

The backpack paint sprayer 100 (hereinafter invention) comprises a backpack 200, a spray gun 240, and a hose assembly 260. The invention 100 may be a portable spray-painting system. The backpack 200 may carry a supply of paint which may be pumped from the backpack 200 to the spray gun 240 via the hose assembly 260. A turbine located within the spray gun 240 may create an air stream that may atomize the paint and may disperse the paint over a surface being painted. The backpack 200 may be adapted to be worn by a user and may enable the user to move about without being constrained by a paint supply hose coupled between the spray gun 240 and a compressor.

The backpack 200 may comprise a paint reservoir 202, a pump 206, and one or more battery packs 208. The backpack 200 may be adapted to be worn on the back of the user. The backpack 200 may be the source of the paint that is supplied to the spray gun 240. Specifically, the paint reservoir 202 within the backpack 200 may be filled with the paint and the paint may be pumped to the spray gun 240 by the pump 206.

The paint reservoir 202 may be a container within the backpack 200 that is operable to hold a supply of the paint. The paint reservoir 202 may be filled through the top of the paint reservoir 202 via a filler tray 212 located on the exterior of the backpack 200. The paint may exit the paint reservoir 202 at the bottom of the paint reservoir 202 as the pump 206 draws the paint.

In some embodiments, the paint reservoir 202 may comprise a liner to prevent the paint from sticking to interior walls of the paint reservoir 202. The liner may be removeable and replaceable.

The pump 206 may move the paint from the paint reservoir 202 to the spray gun 240. The pump 206 may be electromechanical and may comprise an internal motor that may be energized by the application of an electrical potential to the pump 206. As non-limiting examples, the pump 206 may move the paint by applying rotary motion, reciprocating motion, linear motion, or any combination thereof to one or more gears, screws, pistons, shuttle blocks, vanes, diaphragms, plungers, chains, ropes, impellers, or combinations thereof.

The one or more battery packs 208 may comprise one or more energy-storage devices. The one or more battery packs 208 may be a source of electrical energy to operate the pump 206 and a motor 244 in the spray gun 240. The one or more battery packs 208 may be rechargeable and replaceable.

The filler tray 212 may be located on the rear of the backpack 200 and may extend horizontally away from the backpack 200. The filler tray 212 direct the paint that is poured into the filler tray 212 into the paint reservoir 202 within the backpack 200. A strainer 214 may detachably couple to the filler tray 212 and may filter lumps of paint and foreign debris out of the paint.

A backpack hose coupler 216 and a backpack power port 218 may be accessible on the exterior of the backpack 200. One end of the hose assembly 260 may detachably couple to the backpack hose coupler 216 and the backpack power port 218 in order to transfer the paint and electrical power to the spray gun 240. The backpack hose coupler 216 and the backpack power port 218 may be duplicated on both lateral sides of the backpack 200 so that the hose assembly 260 can be coupled on either side of the backpack 200.

The backpack 200 may comprise one or more spray gun hooks 222. The one or more spray gun hooks 222 may be operable to retain the spray gun 240 when the spray gun 240 is not in use. The one or more spray gun hooks 222 may be located at the top of opposite lateral sides of the backpack 200. The bottom of the backpack 200 may comprise a support stand 220 so that the backpack 200 may stand upright when not being worn.

The backpack 200 may comprise a pair of shoulder straps 230 coupled to the rear of the backpack 200. The pair of shoulder straps 230 may be adapted to be worn over the shoulders of the user such that the backpack 200 may be positioned behind the user. The pair of shoulder straps 230 may comprise length adjusters 232 so that the fit of the pair of shoulder straps 230 may be adjusted.

The backpack 200 may comprise padding 234 located on the rear of the backpack 200. The padding 234 may be adapted to cushion the backpack 200 against the back of the user for increased comfort.

The spray gun 240 may be adapted to be held by the user while the user applies the paint to the surface. The spray gun 240 may spray the paint from a spray head 248 when a trigger 250 is squeezed. A fan 246 may move air from an air intake vent 256 to the spray head 248 when the motor 244 is energized. The spray gun 240 may comprise a spray gun hose coupler 254 for coupling the hose assembly 260 to the spray gun 240.

The turbine within the spray gun 240 may create the air stream used to atomize the paint. As a non-limiting example, the turbine may comprise the motor 244 and the fan 246. The motor 244 may be energized from the one or more battery packs 208 via a power transfer cord 266 when the trigger 250 is activated.

The spray head 248 may combine the paint with the air stream to atomize the paint and may direct atomized paint towards the surface. The trigger 250 may be adapted to be squeezed by the user in order to dispense the atomized paint. Squeezing the trigger 250 may open a valve that enables the air stream to pass through the spray head 248 and may electrically signal the pump 206 to supply the paint through the hose assembly 260. Releasing the trigger 250 may stop the air stream and the flow of the paint to the spray gun 240.

The spray gun 240 may comprise one or more spray adjustments 252. The one or more spray adjustments 252 may be incorporated into the spray head 248 of the spray gun 240 or as one or more dials, switches, or other controls located on the body of the spray gun 240. As non-limiting examples, the spray head 248 may be adjustable to control the orientation of the pattern, the width of the pattern, the density of the paint, or any combination thereof.

The hose assembly 260 may transfer the paint and electrical power from the backpack 200 to the spray gun 240. The hose assembly 260 may also carry one or more operational signals such as the electrical signal form the trigger 250 to the pump 206. The hose assembly 260 may comprise a paint hose 262 to carry the paint and the power transfer cord 266 to carry electrical power and the one or more operational signals. The paint hose 262 may comprise a hose paint coupler 264 for coupling the paint hose 262 to the backpack hose coupler 216 on the backpack 200 and a hose power coupler 268 for coupling the power transfer cord 266 to the backpack power port 218 on the backpack 200. The end of the hose assembly 260 that is opposite the hose paint coupler 264 and the hose paint coupler 264 may comprise a gun coupler 270 such that the hose assembly 260 may couple to the spray gun 240.

Note that the paint and power couplings between the hose assembly 260 and the backpack 200 and between the hose assembly 260 and the spray gun 240 may be combined into a single coupler as illustrated by the spray gun hose coupler 254 coupling to the gun coupler 270 or may be kept separate as illustrated by the backpack hose coupler 216 coupling to the hose paint coupler 264 and by the backpack power port 218 coupling to the hose power coupler 268. The specific couplings shown in the figures are non-limiting examples and the combination or separation of couplers may be used at either end of the hose assembly 260.

In some embodiments, the backpack 200 may comprise an A/C power cord 272 such that the one or more battery packs 208 may be recharged and/or the pump 206 may be operated from an A/C power source.

In use, the backpack 200 may be placed upright on the support stand 220 and paint may be added to the paint reservoir 202 by pouring the paint into the filler tray 212 through the strainer 214. The hose assembly 260 may be coupled between the backpack 200 and the spray gun 240. The user may don the backpack 200 by placing the backpack 200 against their back with the pair of shoulder straps 230 over their shoulders. The trigger 250 may be squeezed while pointing the spray head 248 away from the surface to be painted in order to energize the pump 206 and move the paint through the paint hose 262 to the spray gun 240. Once the atomized paint is being dispensed via the spray head 248, the spray gun 240 may be passed over the surface while squeezing the trigger 250 to dispense the paint onto the surface.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

Within this disclosure, the word "compressor" may refer to a pump that is dedicated to compressing a fluid or placing a fluid under pressure. The fluid being compressed may be gaseous or liquid.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem.

As used in this disclosure, the word "exterior" may be used as a relational term that implies that an object is not located or contained within the boundary of a structure or a space.

As used in this disclosure, a "fan" may be a mechanical device with rotating blades that is used to create a flow or current of air.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used herein, the word "hose" may include hoses, tubing, piping, and other conduits capable of directing a flow of a gas or a liquid. When referring to a hose in this disclosure, the terms inner diameter and outer diameter are used as they would be used by those skilled in the plumbing arts.

As used in this disclosure, the word "interior" may be used as a relational term that implies that an object is located or contained within the boundary of a structure or a space.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "motor" may refer to a device that transforms energy from an external power source into mechanical energy.

As used in this disclosure, "orientation" may refer to the positioning and/or angular alignment of a first object relative to a second object or relative to a reference position or reference direction.

As used in this disclosure, when used as a noun the term "paint" may refer to a pigment based colloid or solution that is applied to a surface as a coating of the surface. When used as a verb, the term paint refers to the application of paint to a surface.

As used herein, the word "portable" may refer to a device that may be carried by a single person and may be used at multiple locations. In some cases, portable may imply that the device may be used while being carried.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

As used in this disclosure, a "spray" may be a plurality of liquid drops projected from a nozzle.

As used in this disclosure, a "valve" may be a device that is used to control the flow of a fluid, either gas or liquid, through a pipe or to control the flow of a fluid into and out of a container. Some valves may have multiple ports and may allow the diverting or mixing of fluids.

As used in this disclosure, a "vent" may be an opening in the structure that allows air to enter or escape.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A backpack paint sprayer comprising:

a backpack, a spray gun, and a hose assembly;

wherein the backpack paint sprayer is a portable spray-painting system;

wherein the backpack carries a supply of paint which is pumped from the backpack to the spray gun via the hose assembly;

wherein a turbine located within the spray gun creates an air stream that atomizes the paint and disperses the paint over a surface being painted;

wherein the backpack is adapted to be worn by a user and enables the user to move about without being constrained by a paint supply hose;

wherein the backpack comprises a paint reservoir, a pump, and one or more battery packs;

wherein the backpack is adapted to be worn on a back of the user;

wherein the backpack is a source of the paint that is supplied to the spray gun;

wherein the paint reservoir is within the backpack, is filled with the paint, and the paint is pumped to the spray gun by the pump;

wherein a backpack hose coupler and a backpack power port are accessible on an exterior of the backpack;

wherein one end of the hose assembly detachably couples to the backpack hose coupler and the backpack power port in order to transfer the paint and electrical power to the spray gun; and wherein the backpack hose coupler and the backpack power port are duplicated on both lateral sides of the backpack so that the hose assembly can be coupled on either side of the backpack.

2. The backpack paint sprayer according to claim 1 wherein the paint reservoir is filled through a top of the paint reservoir via a filler tray located on the exterior of the backpack; and wherein the paint exits the paint reservoir at a bottom of the paint reservoir as the pump draws the paint.

3. The backpack paint sprayer according to claim 2 wherein the pump moves the paint from the paint reservoir to the spray gun; and wherein the pump is electromechanical and comprises an internal motor that is energized by application of an electrical potential to the pump.

4. The backpack paint sprayer according to claim 3 wherein the pump moves the paint by applying rotary motion, reciprocating motion, linear motion, or any combination thereof to one or more gears, screws, pistons, shuttle blocks, vanes, diaphragms, plungers, chains, ropes, impellers, or combinations thereof.

5. The backpack paint sprayer according to claim 3 wherein the one or more battery packs comprise one or more energy-storage devices;

wherein the one or more battery packs are a source of electrical energy to operate the pump and a motor in the spray gun; and wherein the one or more battery packs are rechargeable and replaceable.

6. The backpack paint sprayer according to claim 5 wherein the filler tray is located on a rear of the backpack and extends horizontally away from the backpack;

wherein the filler tray directs the paint that is poured into the filler tray into the paint reservoir within the backpack; and wherein a strainer detachably couples to the filler tray and filters lumps of paint and foreign debris out of the paint.

7. The backpack paint sprayer according to claim 6 wherein the backpack comprises one or more spray gun hooks;

wherein the one or more spray gun hooks are operable to retain the spray gun when the spray gun is not in use;

wherein the one or more spray gun hooks are located at a top of opposite lateral sides of the backpack; and wherein a bottom of the backpack comprises a support stand so that the backpack stands upright when not being worn.

8. The backpack paint sprayer according to claim 7 wherein the backpack comprises a pair of shoulder straps coupled to the rear of the backpack;

wherein the pair of shoulder straps are adapted to be worn over shoulders of the user such that the backpack is positioned behind the user; and wherein the pair of shoulder straps comprise length adjusters so that a fit of the pair of shoulder straps is adjustable.

9. The backpack paint sprayer according to claim 8 wherein the backpack comprises padding located on the rear of the backpack; and wherein the padding is adapted to cushion the backpack against the back of the user.

10. The backpack paint sprayer according to claim 9 wherein the spray gun is adapted to be held by the user while the user applies the paint to the surface;

wherein the spray gun sprays the paint from a spray head when a trigger is squeezed;

wherein a fan moves air from an air intake vent to the spray head when the motor is energized; and wherein the spray gun comprises a spray gun hose coupler for coupling the hose assembly to the spray gun.

11. The backpack paint sprayer according to claim 10 wherein the turbine within the spray gun creates the air stream used to atomize the paint.

12. The backpack paint sprayer according to claim 11 wherein the turbine comprises the motor and the fan; and wherein the motor is energized from the one or more battery packs via a power transfer cord when the trigger is activated.

13. The backpack paint sprayer according to claim 12 wherein the spray head combines the paint with the air stream to atomize the paint and directs atomized paint towards the surface;

wherein the trigger is adapted to be squeezed by the user in order to dispense the atomized paint;

wherein squeezing the trigger opens a valve that enables the air stream to pass through the spray head and electrically signals the pump to supply the paint through the hose assembly; and wherein releasing the trigger stops the air stream and a flow of the paint to the spray gun.

14. The backpack paint sprayer according to claim 13 wherein the spray gun comprises one or more spray adjustments; and wherein the one or more spray adjustments are incorporated into the spray head of the spray gun or as one or more dials, switches, or other controls located on a body of the spray gun.

15. The backpack paint sprayer according to claim 14 wherein the spray head is adjustable to control an orientation of the pattern, a width of the pattern, a density of the paint, or any combination thereof.

16. The backpack paint sprayer according to claim 14 wherein the hose assembly transfers the paint and electrical power from the backpack to the spray gun;

wherein the hose assembly carries one or more operational signals such as an electrical signal form the trigger to the pump;

wherein the hose assembly comprises a paint hose to carry the paint and the power transfer cord to carry electrical power and the one or more operational signals;

wherein the paint hose comprises a hose paint coupler for coupling the paint hose to the backpack hose coupler on the backpack and a hose power coupler for coupling the power transfer cord to the backpack power port on the backpack; and wherein an end of the hose assembly that is opposite the hose paint coupler and the hose paint coupler comprises a gun coupler such that the hose assembly is operable to couple to the spray gun.

17. The backpack paint sprayer according to claim 16 wherein the backpack comprises an A/C power cord such that the one or more battery packs are recharged and/or the pump is operated from an A/C power source.

* * * * *